Sept. 12, 1961     I. M. LEVY     2,999,953
WINDING ARRANGEMENT FOR DYNAMOELECTRIC MACHINE
Filed Sept. 29, 1959
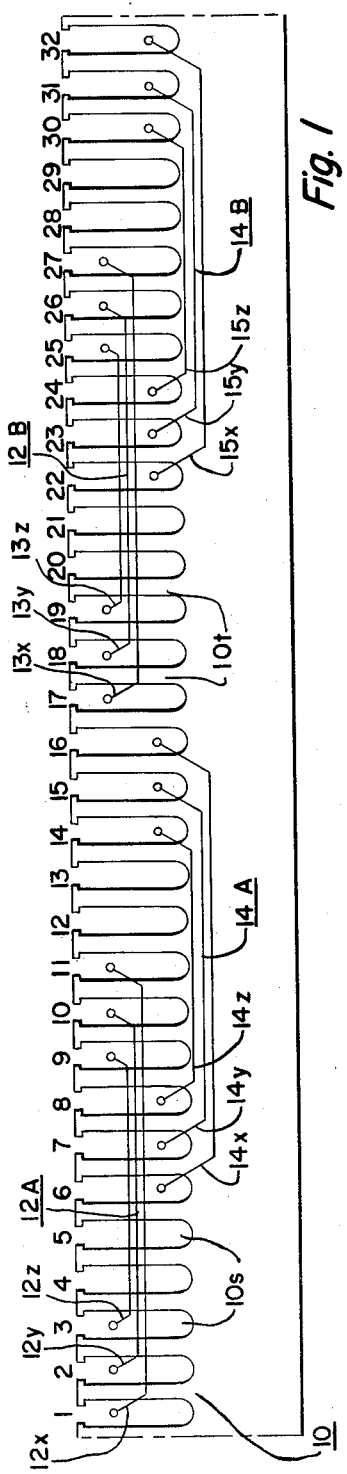
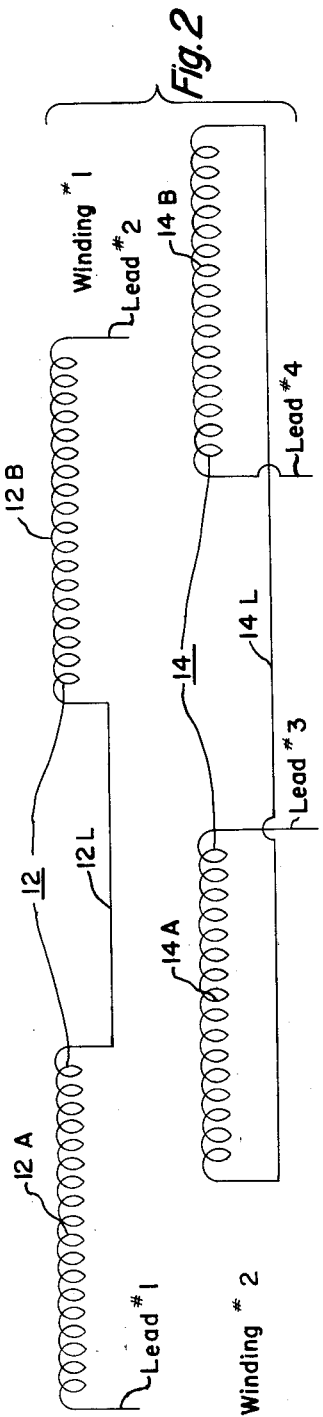
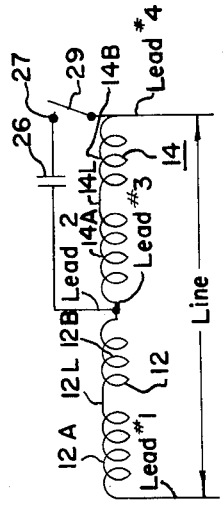
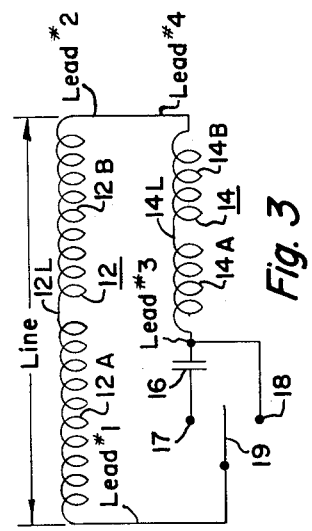
INVENTOR.
Irving M. Levy
BY
His Attorney

United States Patent Office 2,999,953
Patented Sept. 12, 1961

2,999,953
WINDING ARRANGEMENT FOR DYNAMO-
ELECTRIC MACHINE
Irving M. Levy, Dayton, Ohio, assignor to General Motors Corporation, Detroit, Mich., a corporation of Delaware
Filed Sept. 29, 1959, Ser. No. 843,158
4 Claims. (Cl. 310—166)

This invention relates to dynamoelectric machines and particularly to a stator winding for a capacitor start motor.

An object of this invention is to provide a new and improved stator winding arrangement for a dynamoelectric machine.

Another object of this invention is to provide a stator winding arrangement for a capacitor start motor without separate starting windings and having coils from each pole group overlapping each other at least in part such that only one coil side per slot is necessary.

Another object of this invention is to provide a dynamoelectric machine having a predetermined number of slots in a stator shown having thirty-two slots for the purpose of illustrating this invention and fitted with two pairs of coils each spanning at least ten slots, the pairs having overlap portions spanning at least five slots such that the coils are connectible in series-parallel relation with each other in predetermined sequence to provide starting operation in conjunction with phase shift means such as a capacitor and running operation without phase shift means in circuit.

Still a further object of this invention in one winding embodiment is to provide a dynamoelectric machine stator winding arrangement including thirty-two slots in a stator having a first coil spanning slots 1–11, having a second coil spanning slots 17–27 to define a pair of pole groups also including a third coil spanning slots 6–16 and a fourth coil spanning slots 22–32, respectively as part of the pole groups, the first and second coils are always interconnected for the same polarity and the third and fourth coils are always interconnected for the same polarity but opposite that of the first and second coils while voltage of power supply is always connected to leads 1 and 4 of the first and fourth coils respectively and phase shift means such as capacitance is always connected to one of the groups such as at lead 3 and one power supply line during starting accomplished without a separate starting winding.

Another object of this invention is to provide a stator winding arrangement for a capacitor start motor without separate starting windings and including one pair of coils overlapping in part relative to each other in each of a pair of pole groups such that the coils are connected by switching means to give consequent pole main and starting winding operation and then switched with the windings in parallel to produce all wound poles when up to operating speed while only one coil side per slot is necessary.

Further objects and advantages of the present invention will be apparent from the following description, reference being had to the accompanying drawings wherein preferred embodiments of the present invention are clearly shown.

In the drawings:

FIGURE 1 is a developed view of a slotted stator and winding arrangement including coil elements fitted thereto in accordance with the present invention.

FIGURE 2 is a schematic diagram of coil elements interconnected in predetermined overlapping relation for the slotted stator of FIGURE 1.

FIGURE 3 is a circuit diagram for stator winding connection in accordance with the present invention.

FIGURE 4 is another circuit diagram for stator winding connection in accordance with the present invention.

In FIGURE 1, there is shown a developed view of a stator 10 which is normally annular in structure and adapted to fit into a dynamoelectric machine housing in a well-known manner. Such a dynamoelectric machine may include end frames provided with bearings for journalling opposite ends of a shaft that can be provided with a rotor that may be of a cast squirrel-cage winding forming no part of the present invention. The present invention is directed to a stator winding arrangement for such a dynamoelectric machine. In the embodiment shown the stator 10 in accordance with the present invention includes thirty-two slots identified by reference numeral 10s and separated from each other by radially extending teeth 10t. In the view of FIGURE 1, slot openings are numbered and marked consecutively and arbitrarily from 1 through 32. A first winding generally indicated by numeral 12 and a second winding generally indicated by numeral 14 are fitted into predetermined slots and have predetermined overlapping relationship relative to each other as is more fully described below.

The first winding 12 includes coils or elements 12A and 12B joined and interconnected relative to each other at ends for the same polarity by an internal lead or connection 12L. The other ends of the coils 12A and 12B are provided with electrical connections identified as leads number 1 and number 2 respectively as indicated in FIGURES 2, 3 and 4. The coil or element 12A includes at least two or more sectors concentric relative to each other and having opposite coil sides fitted into individual slots none of which need be shared with any other coil sides or segments thereof. In the embodiment shown, segments of coil or element 12A span five, seven and nine slots. An outer concentric segment 12x has one side in slot number 1 and an opposite coil side in slot number 11. An intermediate segment 12y of coil element 12A has one coil side in slot number 2 and an opposite coil side in slot number 10. A central or intercoil segment 12z has one coil side in slot number 3 and an opposite coil side in slot 9.

Similarly, the coil or element 12B includes two or more concentric segments or sectors identified by reference numerals 13x, 13y and 13z for outer intermediate and inner segments respectively. The outer concentric segment 13x has coil sides in slots 17 and 27, the intermediate segment 13y has opposite coil sides in slots 18 and 26, and the inner segment 13z has opposite coil sides in slots 19 and 25.

The second winding 14 includes a coil or element 14A and another coil or element 14B having at least partial overlapping relationship relative to coils or elements 12A and 12B respectively. The ends of coils or elements 14A and 14B remote from each other are interconnected electrically by an internal connection or lead 14L so that these coils are of the same polarity. The two remaining coil ends are identified as lead number 3 and lead number 4 respectively as indicated in FIGURES 2, 3 and 4. FIGURES 1 and 2 are shown in the drawings adjacent to each other such that coils or elements 12A, 12B, 14A and 14B are in alignment vertically and to illustrate overlapping relationship therebetween in both FIGURES 1 and 2.

Coil or element 14A may include concentric segments or sectors 14x, 14y and 14z having opposite coil sides extending from slots 6–16, 7–15, and 8–14 respectively as shown in FIGURE 1. Similarly, coil or element 14B includes sectors or segments 15x, 15y and 15z that have opposite coil sides in slots 22–32, 23–31 and 24–30 respectively as shown in FIGURE 1. The coil sectors or segments of elements 12A, 12B, 14A and 14B are connected in series with each other for each individual coil or element. The winding arrangement in accordance with the present invention is for a single motor of the capacitor start or resistance split-phase type without a separate starting winding.

FIGURE 3 is a circuit diagram for a stator winding connection in accordance with the present invention. Line voltage from a suitable source of power is supplied to leads number 1 and number 2. Leads number 2 and number 4 are connected to each other such that in effect all four elements 12A, 12B, 14B and 14A are connected in series with each other in the progression just noted. However, actually, the supply of line voltage to leads number 1 and number 2 as shown in FIGURE 3 is such that winding number 1 identified by reference numeral 12 generally is in parallel with the series circuit of a phase shifting means and the second winding indicated by numeral 14 generally. The second winding 14 is connectible in series with a phase shifting means such as a capacitance 16, this capacitance having a permanent connection to one side directly to lead number 3 and a connection on an opposite side to a fixed terminal 17. The lead number 3 also has a connection to a terminal 18. A selector switch arm 19 is connected to lead number 1 and can be moved to establish electrical connection relative to either terminal 17 or terminal 18. When the arm 19 is connected to terminal 17 a series connection is completed between the second winding 14 and phase shifting means 16 across the line and in parallel with the first winding generally indicated by numeral 12. The current through the second winding 14 leads the current in the first winding 12 due to presence of the capacitance as a phase shifting means and, thus, due to placement of windings in overlapping relationship to each other there are consequent pole main and starting winding operations obtained on the starting connection. When operating speed is attained, the switch arm 19 is connected into electrical engagement with terminal 18 so that the first and second windings are in parallel with each other to produce all wound poles in which electric currents flow in phase with each other due to removal of the phase shifting means 16 from connection in the circuit. In the embodiment of FIGURE 3, actually only three lead numbers 1, 2 and 3 are required for external connections. It is to be understood that the switch arm 19 can be normally actuated, can be automatically actuated using switch means in accordance with Patent No. 2,242,769 Werner, or can be actuated in response to speed of a rotor effective upon weights of a centrifugal switch means the structure and operation of which can be understood by reference to a Patent 2,747,854 Schnepf issued May 29, 1956, and assigned to the assignee of the present invention. Any suitable switch or relay structure can be provided for the switch arm 19.

Another circuit diagram for stator winding connection in accordance with the present invention is illustrated in FIGURE 4. For the connection of FIGURE 4, the elements 12A, 12B, 14A and 14B are connected in series with each other in this sequence due to joining of leads number 2 and number 3 to each other. Line voltage from a suitable source of power is supplied to leads number 1 and number 4. Elements 12A and 12B are internally connected in series with each other by line 12L and similarly elements 14A and 14B are connected internally in series with each other by line 14L as described earlier in this specification. Due to the overlapping relationship of coil sides of elements 12A and 14A as well as elements 12B and 14B respectively in conjunction with unique placement of elements relative to predetermined slots together with interconnection by lines 12L and 14L there results a consequent pole main and starting winding arrangement for a starting connection involving a phase shift means or capacitor 26 connected permanently on one side to lead number 2 and having a terminal 27 connected to an opposite side thereof. A switch or relay arm 29 is provided to establish selective connection for starting and disconnection for running relative to the terminal 27 and lead number 4 which is a common connection with the one end of element 14B to which one side of line voltage is applied. Capacitor start connection includes the phase shift means or capacitor 26 in parallel relationship relative to only elements or segments 14A or 14B of the second winding 14 so as to cause phase shift of current into a different phase relation in the second winding 14 than in the first winding 12 through which a summation of the individual currents through capacitor 26 and the second winding 14 flows. Placement of the first and second windings including elements 12A, 12B, 14A and 14B is exactly the same as shown in FIGURES 1 and 2 and, thus, coil sides of elements 12A and 14A are in overlapping relationship to each other for a span covering slots 6–11 and similarly for elements 12B and 14B in a span covering slots 22–27. Upon attaining operating speed, the switch arm 29 is actuated manually or automatically as the rotor approaches operating speed such that the first and second windings form all wound coils in series with each other and are not affected by a phase shift means such as capacitor 26.

While the embodiments of the present invention as herein disclosed constitutes preferred forms, it is to be understood that other forms might be adopted.

What is claimed is as follows:

1. A dynamoelectric machine stator winding arrangement, comprising, a stator having a total of thirty-two slots, a first winding including a pair of elements spanning slots 1–11 and 17–27 respectively, numbered arbitrarily, said first elements being connected to each other to provide coils of the same polarity, a second winding including another pair of elements spanning slots 6–16 and 22–32 respectively, said second elements being connected to each other for the same polarity opposite to that of the first pair, said elements all having only one coil side per slot and elements of said first and second windings having overlapping relation to each other between slots 6–11 and also slots 22–27.

2. A dynamoelectric machine stator winding arrangement, comprising, a stator having a total of thirty-two slots, a first winding including a pair of elements having concentric segments spanning slots 1–11, 2–10, 3–9 as well as slots 17–27, 18–26, 19–25 respectively, said first elements being connected to each other to provide elements of the same polarity, a second winding including another pair of elements having concentric segments spanning slots 6–16, 7–15, 8–14 as well as slots 22–32, 23–31, 24–30 respectively, said second elements being connected to each other for the same polarity opposite to that of said first elements, said elements all having only one coil side per slot and elements of said first and second windings having overlapping relation to each other in space between slots 6–11 and also slots 22–27.

3. A dynamoelectric machine stator winding circuit arrangement, comprising, a stator having a total of thirty-two slots, a first winding including a pair of elements spanning slots 1–11 and 17–27 respectively, said first elements being connected to provide elements of the same polarity, a second winding including another pair of elements spanning slots 6–16 and 22–32 respectively, said second elements being connected to each other for the same polarity opposite to that of said first elements, a first pair of leads coming from free ends of elements of said first winding, a second pair of leads coming from free ends of said second winding, a phase shifting means connected to one lead of said second pair as well as to a switching means adapted to be closed in series therewith for starting operation, and a connection to line voltage from a source of power provided relative to one lead of said first pair and at least one lead of said second pair, said elements all having only one coil side per slot and elements of said first and second windings having overlapping relation to each other between slots 6–11 and also slots 22–27.

4. A dynamoelectric machine stator winding circuit arrangement, comprising, a stator having a predetermined number of slots therein, a first winding having a pair of coil elements spanning a predetermined number of slots, said elements being connected to have the same polarity, a second winding having another pair of coil elements having substantially the same span as those of the first winding, said elements of said second winding being connected for the same polarity opposite to that of the first winding, a phase shifting means connected to one lead of the windings as well as a switching means adapted to be closed in series therewith for starting operation and open for running operation, and a connection to line voltage from a source of power provided relative to one lead of said first winding and a further lead, said elements of said second winding having partial overlapping relative to elements of said first winding though only one coil side per slot is necessary, the line voltage connection being made such that consequent pole winding arrangement is obtained relative to said phase shifting means for starting operation and then the switching means establishes the windings in parallel to produce all wound poles for running operation.

References Cited in the file of this patent

UNITED STATES PATENTS 2,546,877     Taltavull _____ Mar. 27, 1951

FOREIGN PATENTS 361,340     France _____ June 15, 1906
450,515     Canada _____ Aug. 17, 1948